United States Patent
Mudd et al.

(10) Patent No.: US 9,075,220 B2
(45) Date of Patent: Jul. 7, 2015

(54) OPTICAL FIBER MODULE WITH MOUNTING BLOCK FOR SECURING AN OPTICAL FIBER CONNECTOR

(71) Applicant: CommScope, Inc. of North Carolina, Hickory, NC (US)

(72) Inventors: Ronald L. Mudd, Sachse, TX (US); Bradley Billman, Sachse, TX (US)

(73) Assignee: CommScope, Inc. of North Carolina, Hickory, NC (US)

( * ) Notice: Subject to any disclaimer, the term of this patent is extended or adjusted under 35 U.S.C. 154(b) by 373 days.

(21) Appl. No.: 13/746,674

(22) Filed: Jan. 22, 2013

(65) Prior Publication Data

US 2013/0195418 A1 Aug. 1, 2013

Related U.S. Application Data

(60) Provisional application No. 61/591,550, filed on Jan. 27, 2012.

(51) Int. Cl.
  *G02B 6/00* (2006.01)
  *G02B 6/44* (2006.01)
  *G02B 6/38* (2006.01)

(52) U.S. Cl.
  CPC ............ *G02B 6/4475* (2013.01); *G02B 6/3825* (2013.01); *G02B 6/3877* (2013.01); *G02B 6/3897* (2013.01); *G02B 6/4441* (2013.01)

(58) Field of Classification Search
  USPC .......................................................... 385/53
  See application file for complete search history.

(56) References Cited

U.S. PATENT DOCUMENTS

| 5,497,444 | A | * | 3/1996 | Wheeler ........................ 385/135 |
| 5,896,477 | A | * | 4/1999 | Stephenson et al. ............ 385/53 |
| 5,930,425 | A | * | 7/1999 | Abel et al. ....................... 385/53 |
| 6,041,155 | A | * | 3/2000 | Anderson et al. ............. 385/139 |
| 6,478,472 | B1 | * | 11/2002 | Anderson et al. ................ 385/53 |
| 7,153,033 | B2 | * | 12/2006 | Kahle et al. ...................... 385/55 |
| 7,826,706 | B2 |  | 11/2010 | Vongseng et al. |
| 2004/0076377 | A1 |  | 4/2004 | Mizukami et al. |
| 2014/0003772 | A1 | * | 1/2014 | Burkett et al. ................... 385/78 |
| 2014/0133821 | A1 | * | 5/2014 | Mudd ........................... 385/136 |

FOREIGN PATENT DOCUMENTS

EP 0749026 A2 12/1996
JP 02-181710 A 7/1990

* cited by examiner

*Primary Examiner* — Sung Pak
(74) *Attorney, Agent, or Firm* — Muncy, Geissler, Olds & Lowe, P.C.

(57) ABSTRACT

An optical fiber module includes a plate having a first side, a second side and at least one through opening, a plurality of connection elements at the first side, and a mounting block at the second side that is configured to secure, relative to the plate, at least one second fiber optic connector which has a longitudinal axis, an end, a wide portion and an end portion between the wide portion and the end. The mounting block includes a channel having an enlarged portion configured to receive the wide portion of the at least one second fiber optic connector, and the channel is configured to permit the insertion of the at least one second fiber optic connector in a direction perpendicular to the longitudinal axis while preventing the removal of the at least one second fiber optic connector in any direction parallel to the longitudinal axis.

20 Claims, 5 Drawing Sheets

OPTICAL FIBER MODULE WITH MOUNTING BLOCK FOR SECURING AN OPTICAL FIBER CONNECTOR

CROSS-REFERENCE TO RELATED APPLICATIONS

The present application claims the benefit of U.S. Provisional Patent Application No. 61/591,550 filed Jan. 27, 2012, the entire contents of which are hereby incorporated by reference.

FIELD OF THE INVENTION

The present invention is directed to an optical fiber module for securing an optical fiber connector relative to a portion of the module, and, more specifically, toward an optical fiber module having a mounting block with a channel configured to receive an optical fiber connector in a direction perpendicular to the length of the optical fiber connector and hold the optical fiber connector in a given location relative to a plate portion of the module.

BACKGROUND OF THE INVENTION

Various types of modules are known for enclosing optical fibers, and, in particular, for enclosing locations at which optical fibers are spliced or joined with connectors. For example, a fiber optic fan-out module is a product used in networks to split optical signals out from a high density cable into individual fibers and to provide connectors for connecting each of the individual fibers to other fibers. A high density cable enters one portion of the module, and the individual fibers are separated inside the module and connected to a plurality of connection locations inside the module. Connectors at each connection location allow other optical fibers outside the module to be connected to the individual fibers in the module. These modules may be mounted in a patch panel in a rack in a datacenter or other location where optical fiber interconnections are needed.

Generally, customers would like fan out modules to be as small as reasonably possible in order to increase density in a patch panel. One limiting feature of the modules that makes reducing their size difficult is the size of the fiber optic connectors used inside the modules. Often, the same type of connector is used inside a module as is used outside of the module, and these conventional connectors include, among other elements, a ferrule, a spring push, a spring, a connector body holding the ferrule, and a strain-relief boot. These elements perform useful functions outside a module but are not always needed for connections inside a module. It would therefore be desirable to provide a more compact connector arrangement for use in places like optical fiber modules.

SUMMARY OF THE INVENTION

This problem and others are addressed by embodiments of the present invention, a first aspect of which comprises an optical fiber module including a plate having a first side, a second side and at least one through opening. A plurality of connection elements at the first side are configured to releasably secure a plurality of first fiber optic connectors relative to the plate, and a mounting block at the second side of the plate is configured to secure at least one second fiber optic connector relative to the plate. The mounting block includes a front wall facing the second side, a rear wall spaced from the front wall, a side wall between the front wall and the rear wall and a first channel in the side wall. The first channel has a side wall opening in the side wall, a front end opening and a rear end opening, a channel bottom and first and second spaced channel sides, a length in a direction from the front wall to the rear wall, a depth from the side wall to the channel bottom and a width between the channel sides. The first channel also has a first portion having a first width, a second portion between the front end opening and the first portion having a second width and a third portion between the rear end opening and the first portion having a third width, and the first width is greater than the second width or greater than the third width.

Another aspect of the invention comprises an optical fiber module including plate means having a first side, a second side and at least one through opening, a plurality of connection elements at the first side configured to releasably secure a plurality of first fiber optic connectors relative to the plate means and mounting means at the second side of the plate means, the mounting means including means for securing at least one connector of a plurality of second connectors relative to the plate means.

A further aspect of the invention comprises an optical fiber module that includes a plate having a first side, a second side and at least one through opening and a plurality of connection elements at the first side configured to releasably secure a plurality of first fiber optic connectors relative to the plate. The module also includes a mounting block at the second side of the plate that is configured to secure, relative to the plate, at least one second fiber optic connector having a longitudinal axis, an end, a wide portion and an end portion between the wide portion and the end. The mounting block includes a channel having an enlarged portion configured to receive the wide portion of the at least one second fiber optic connector, and the channel is configured to permit the insertion of the at least one second fiber optic connector in a direction perpendicular to the longitudinal axis while preventing the removal of the at least one second fiber optic connector in any direction parallel to the longitudinal axis.

BRIEF DESCRIPTION OF THE DRAWINGS

These aspects of the invention and others will be better understood after a reading of the following detailed description together with the attached drawings, wherein.

DETAILED DESCRIPTION

Figure 1:
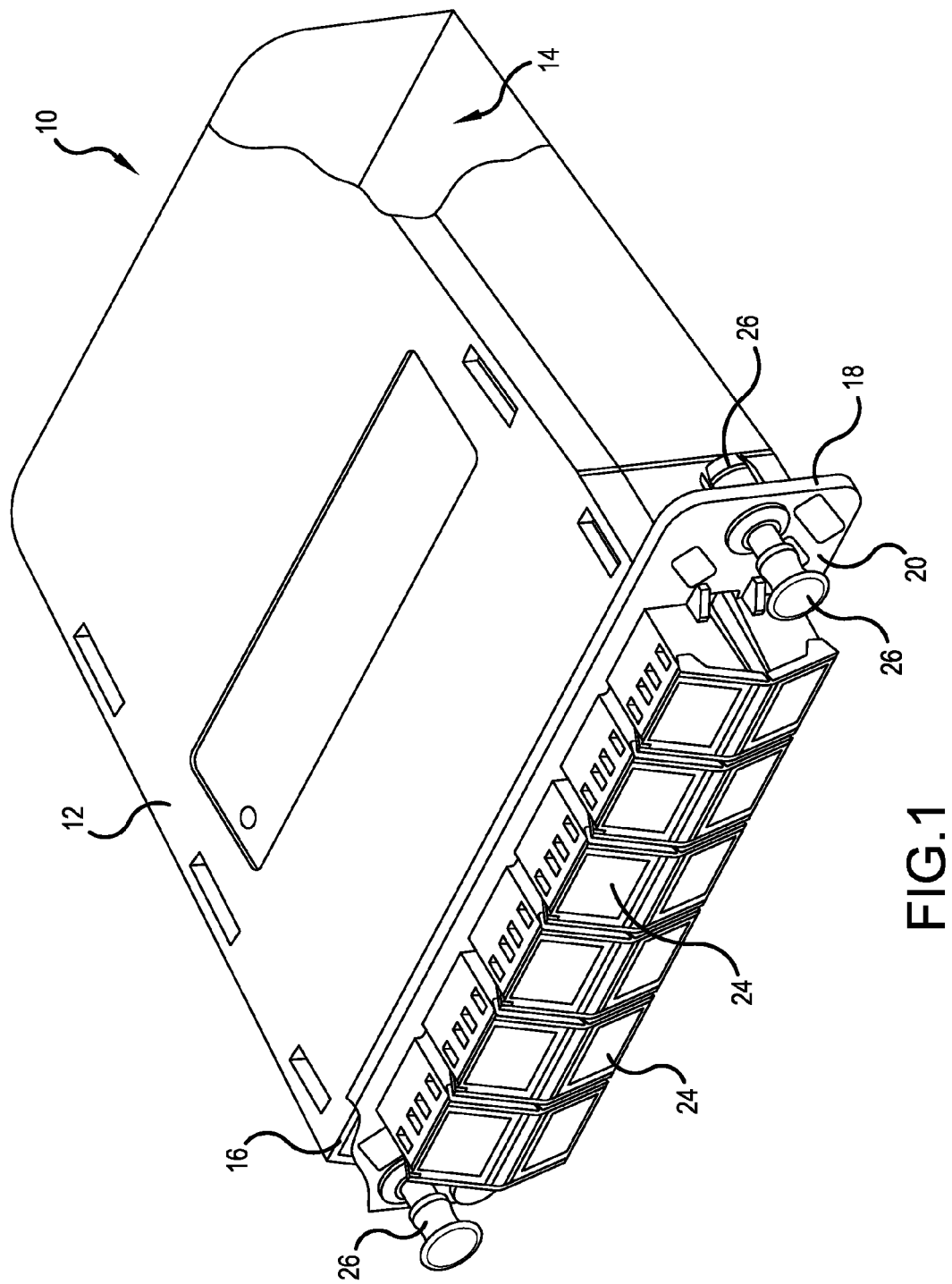
FIG. 1 is a perspective view of an optical fiber module that includes a housing having one end closed by a plate according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 shows a module 10 comprising a housing 12 having an interior 14 and a front opening 16 covered by a plate 18. The plate 18 has a first side 20 facing away from the housing 12 and a second side 22 facing the interior 14 of the housing 12. The first side 20 is provided with a plurality of connection elements 24 that are configured to releasably secure a plurality of first fiber optic connectors (not illustrated) which may comprise, for example, LC, FC, SC, ST, MU, E-2000, or E-3000 connectors, relative to the plate 18. The plate 18 also includes first and second mounting pins 26 for connecting the module 10 to a patch panel or rack (not illustrated).

Figure 2:
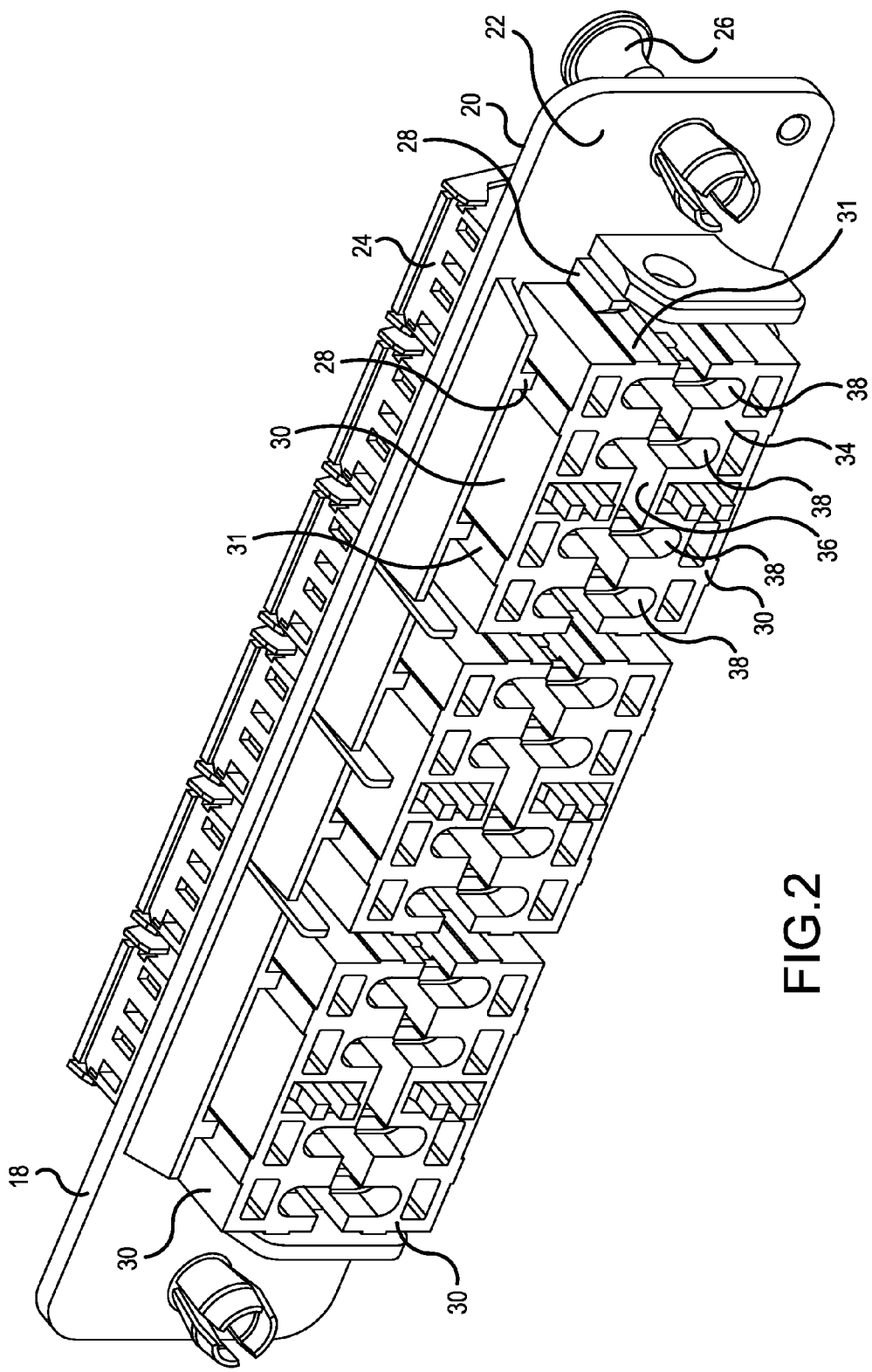
FIG. 2 is a perspective view of the plate of FIG. 1 removed from the housing and showing a plurality of mounting blocks connected thereto.
Figure 3:
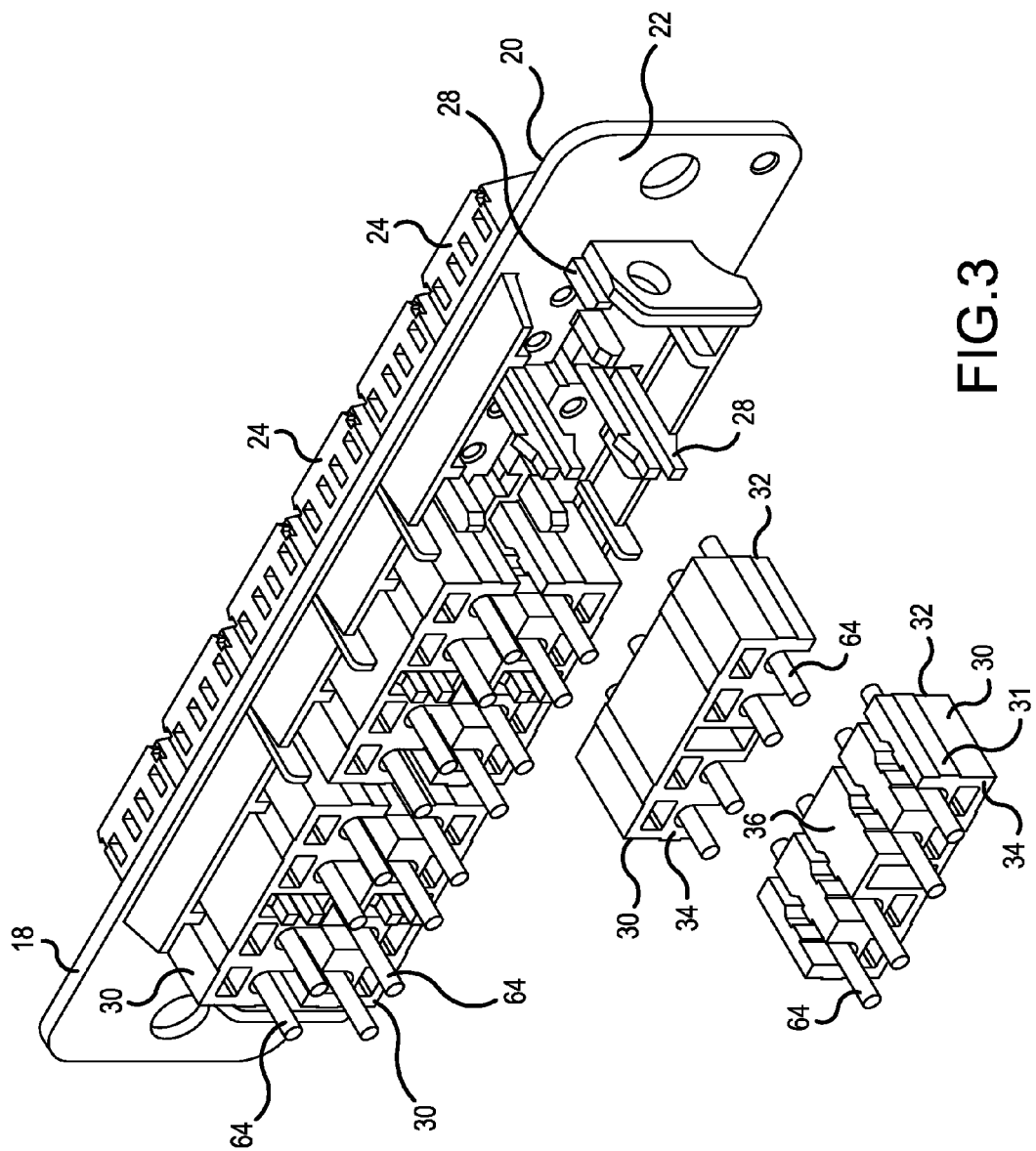
FIG. 3 is a partially exploded perspective view of the plate of FIG. 2 showing two of the mounting blocks spaced from their mounting locations on the plate.

The second side 22 of the plate 18 is illustrated in FIGS. 2 and 3. A plurality of arms 28 project from the second side 22 of the plate 18 which arms 28 are configured to releasably retain a plurality of mounting blocks 30 having mounting channels 31 on their exterior surfaces for receiving the arms 28. Six of the mounting blocks 30 are illustrated in each of FIGS. 2 and 3, and two of the mounting blocks 30 are shown spaced from the plate 18 in FIG. 3. As described below, the mounting blocks 30 are configured to receive a plurality of second connectors 64, illustrated in FIGS. 3-5, and to hold them in a given position relative to the plate 18 and thus relative to any first connectors (not illustrated) that are connected to the connection elements 24 on the first side 20 of the plate 18.

Each of the mounting blocks 30 includes a front wall 32 that faces the second side 22 of the plate 18 when the mounting block 30 is mounted on the plate 18, a rear wall 34 spaced from the front wall 32, and a side wall 36 between the front wall 32 and the rear wall 34. The side wall 36 includes four identical channels 38, only one of which will be described in detail herein.

The channel 38 has a front end opening 40 in the front wall 32, a rear end opening 42 in the rear wall 34 and a side wall opening 44 in the side wall 36. The length direction of the channel 38 runs in a direction from the front end opening 40 to the rear end opening 42. The channel 38 also includes a bottom 46 and first and second spaced channel sides 48 defining a channel width there between. As will be appreciated from FIGS. 4 and 5, the width of the channel 38 varies along the channel length from the rear wall 34 to the front wall 32 and includes a first or enlarged portion 50 approximately midway between the front wall 32 and the rear wall 34.

Figure 4:
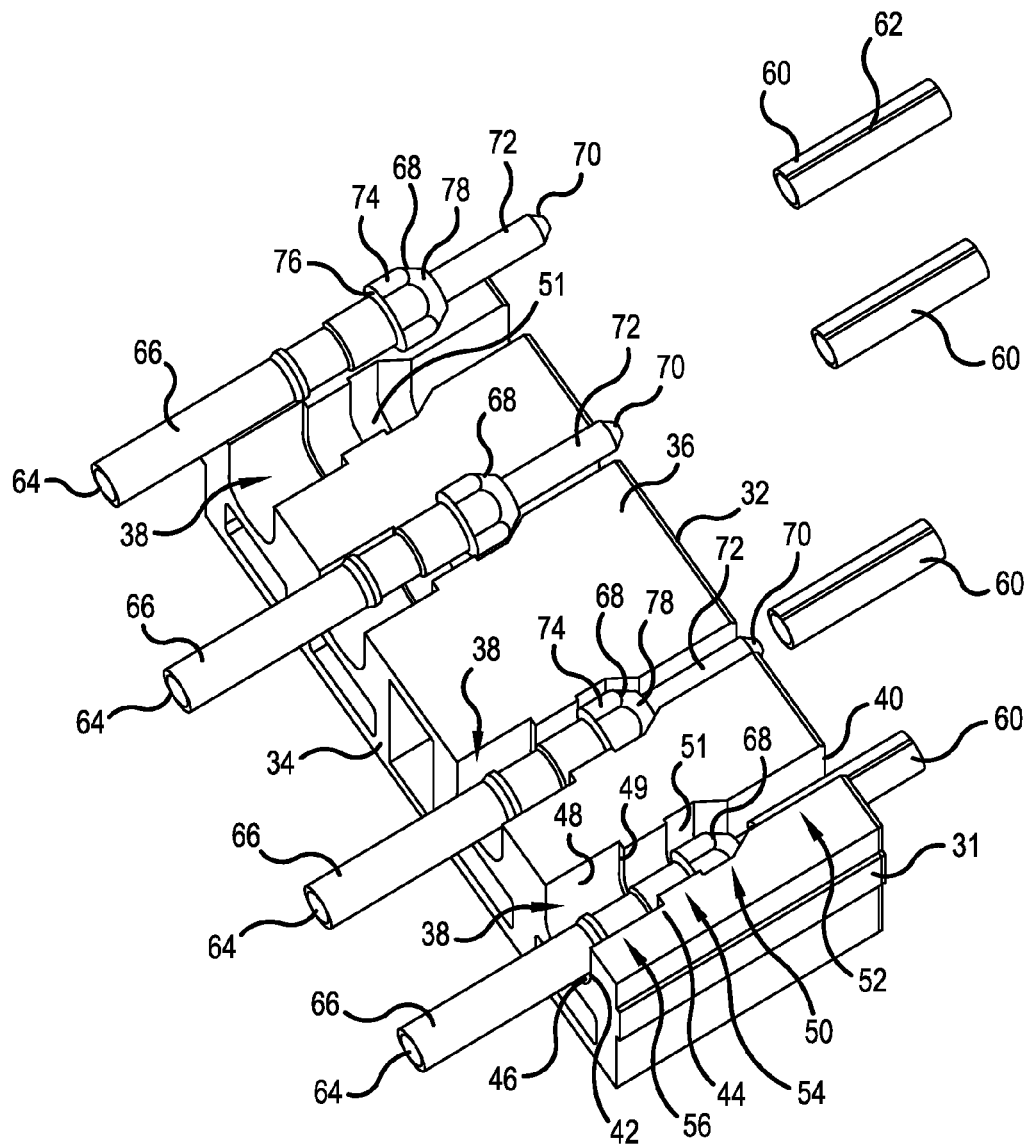
FIG. 4 is a partially exploded rear perspective view of one of the mounting blocks of FIG. 3 and associated connectors.

The enlarged portion 50 is spaced from the front wall 32 by a second portion 52 that is narrower than the enlarged portion 50, and the enlarged portion 50 is spaced from the rear wall 34 by a third portion 54 that is narrower than the enlarged portion 50 and that meets the enlarged portion 50 at a shoulder 49 (FIG. 4). It should be noted that the width of the enlarged portion 50 is greater than the width of the second portion 52 of the channel 38 and greater than the width of the third portion 54 of the channel 38 immediately adjacent to the enlarged portion 50; however, the enlarged portion 50 is not necessarily the widest part of the channel 38, and, indeed, in FIG. 4 it can been seen that a fourth portion 56 of the channel 38 between the rear wall 34 and the channel third portion 54 is wider than the enlarged portion 50. As discussed below, the enlarged portion 50 is configured to accommodate and retain a relatively wide portion of one of the second connectors 64 when the second connector 64 is inserted downwardly into the channel 38, and thus the enlarged portion 50 only needs to be enlarged relative to one or more parts of the channel 38 immediately adjacent thereto to retain the second connector 64 against movement in a longitudinal direction. The enlarged portion 50 also includes planar interior wall portions 51 on its bottom and sides.

The second portion 52 of the channel 38 includes a sleeve-receiving portion 58 near the channel bottom 46 that extends from the front wall 32 of the mounting block 30 toward the enlarged portion 50 of the channel 38 and ending at a shoulder 61. The width of the sleeve-receiving portion 58 is greater than a width of the second portion of the channel 52 between the sleeve-receiving portion 58 and the side wall 36 of the mounting block 30. A sleeve 60 is illustrated in FIGS. 4 and 5 that has an a slot 62 for allowing the sleeve 60 to flex and form a compression fit on the end portion 72 of the second connector 64.

The number of mounting blocks and the number of channels in each mounting block can be varied as desired. For example, each mounting block could include a single channel, and a module would have as many mounting blocks as the number of connectors supported by the module. Alternately, a single mounting block could be provided that has a number of channels equal to the number of connectors supported by the module or by a given row of connectors in the module. The present inventors have found that providing four channels per module provides an acceptable balance between ease of manufacture and ease of assembly and access to the connectors for insertion and removal, but the disclosure should not be interpreted as being limited to mounting blocks having any particular number of channels.

Figure 5:
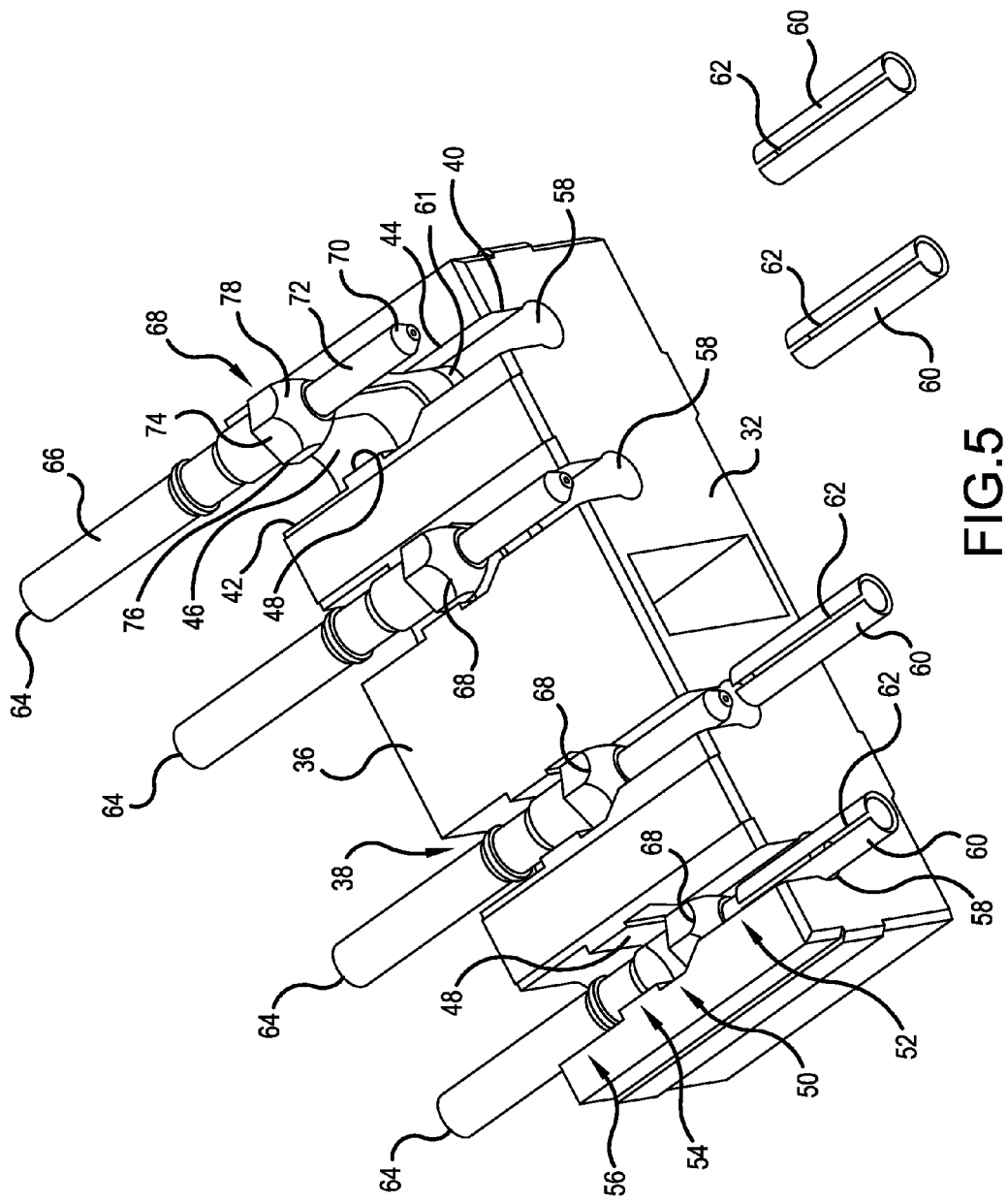
FIG. 5 is a partially exploded front perspective view of the mounting block of FIG. 4.

FIG. 5 illustrates a plurality of the second connectors 64 in various positions relative to the channels 38. Each of the second connectors 64 includes a body 66, a wide portion 68, an end 70 and an end portion 72 between the end 70 and the wide portion 68. The wide portion 68 has a hexagonal cross section and includes six planar side walls 74, a stop wall 76 (FIG. 4) between the planar side walls 74 and the body 66 and a tapered section 78 between the planar side walls 74 and the end portion 72. Connectors such as the second connectors 64 are known in the art and may be referred to as a "ferrule with flange."

The width of the body 66 is generally the same as or slightly less than the width of the fourth portion 56 and the third portion 54 of the channel 38. The wide portion 68 of the second connector 64 is generally the same as the width of the enlarged portion 50 of the channel 38, and the distance from the stop wall 76 to the junction of the tapered section 78 and the end portion 72 is about the same as the length of the enlarged portion 50 of the channel 38 so that the wide portion 68 of the second connector 64 is a close slip fit in the enlarged portion 50 of the channel 38 when the second connector 64 is inserted into the channel 38. The planar side walls 74 of the second connector 64 engage the planar interior walls 51 of the enlarged portion 50 of the channel, and the interference between these interior walls 51 and the polygonal cross section of the enlarged portion 50 of the second connector 64 substantially prevents rotation of the second connector 64 about its longitudinal axis when the wide portion 68 of the second connector 64 is located in the enlarged portion 50 of the channel 38. The width of the second portion 52 of the channel 38 is great enough to allow the end portion 72 of the second connector 64 to pass downwardly therethrough and into the sleeve-receiving portion 58 of the second portion 52 of the channel 38. The tapered section 78 is too wide to fit into the second portion 52 of the channel 38 and thus limits longitudinal movement of the wide portion 68 of the second connector toward the front wall 32 of the mounting block 30. The shoulder 49 engages the stop wall 76 of the wide portion 68 of the second connector 64 and thus limits longitudinal movement of the wide portion 68 toward the rear wall 34 of the second connector 64.

In use, the housing 12 is separated from the plate 18 to expose the mounting blocks 30 on the second side 22 of the plate 18. One of the mounting blocks 30 is removed from the plate 18 by pulling it out from between two or more of the arms 28 that hold the mounting block 30 in place, releasing any catch structures (not illustrated) that may be formed by the arms 28 and the grooves 31 in the mounting blocks 30. One of the second connectors 64 is inserted into the channel 38 in a direction perpendicular to the longitudinal direction of the second connector 64 and perpendicular to the length direction of the channel 38 with the wide portion 68 of the second connector 64 in the enlarged portion 50 of the channel 38. Inserted in this manner, the body 66 of the second connector projects through the third portion 54 and fourth portion 56 of the channel 38 and out the rear end opening 42 of the mounting block 30 while the end portion 72 of the second connector 64 projects into the sleeve-receiving portion 58 of the second portion 52 of the channel 38. The enlarged portion 50 of the channel 38 has approximately the same shape as the wide portion 68 of the second connector 64 and a close fit between the wide portion 68 of the second connector 64 and the enlarged portion 50 of the channel 38 substantially prevents the second connector 64 from moving along its longitudinal axis while mounted in the channel 38.

Next, a sleeve 60 is inserted into the sleeve-receiving opening 58 in the front wall 32 of the mounting block 30 and over the end portion 72 of the second connector 64 until further axial movement is stopped when the sleeve 60 contacts the shoulder 61 in the sleeve-receiving opening 58. The sleeve 60 is retained on the end portion 72 by a friction fit, but the width of sleeve 60 is somewhat less than the widest part of the sleeve-receiving opening 58 which allows the position of the end 70 of the second connector 68 to change slightly when a first connector (not illustrated) is connected thereto. The placement of the sleeve 60 around the end portion 72 of the second connector 64 effectively increases the diameter of the end portion 72 of the second connector 64 so that the second connector 64 can no longer be removed from the channel 38 in a direction perpendicular to the longitudinal axis of the second connector 64. The length of the sleeve 60, together with the relative inflexibility of the portion of the second connector 64 that extends through the mounting block 30 also helps to secure the body 66 of the second connector 64 in the third portion 54 and fourth portion 56 of the channel 38 because the sleeve 60 cannot pivot about an axis perpendicular to its longitudinal axis. This helps keep the body 66 from being lifted out of the channel 38 when the sleeve 60 is in place. Finally, additional second connectors 64 are inserted in additional channels 38 in the mounting block 30 as desired, the mounting block 30 is reconnected to arms 28 on the plate 18, and the housing 12 is replaced on the second side 33 of the plate 18 to enclose the mounting blocks 30.

The present invention has been described herein in terms of presently preferred embodiments. However, modification and additions to these embodiments will become apparent to those of ordinary skill in the art upon a reading of the foregoing description. It is intended that all such modifications and additions form a part of the present invention to the extent they fall within the scope of the several claims appended hereto.

What is claimed is:

1. An optical fiber module comprising:
   a plate having a first side, a second side and at least one through opening;
   a plurality of connection elements at the first side configured to releasably secure a plurality of first fiber optic connectors relative to the plate; and
   a mounting block at the second side of the plate configured to secure at least one second fiber optic connector relative to the plate,
   wherein the mounting block includes a front wall facing the second side, a rear wall spaced from the front wall, a side wall between the front wall and the rear wall and a first channel in the side wall, the first channel having a side wall opening in the side wall, a front end opening and a rear end opening, a channel bottom and first and second spaced channel sides, a length in a direction from the front wall to the rear wall, a depth from the side wall to the channel bottom and a width between the channel sides, wherein the first channel has a first portion having a first width, a second portion between the front end opening and the first portion having a second width and a third portion between the rear end opening and the first portion having a third width, and wherein the first width is greater than the second width or greater than the third width.

2. The optical fiber module of claim 1, further including a housing extending from the plate and having an interior, the mounting block being located in the housing interior.

3. The optical fiber module of claim 1, wherein the front end opening is an opening in the mounting block front wall and the rear end opening is an opening in the mounting block rear wall.

4. The optical fiber module of claim 1, wherein the first width is greater than the second width and greater than the third width.

5. The optical fiber module of claim 4, wherein the second portion of the first channel includes a sleeve-receiving portion at the front end opening, a width of the sleeve-receiving portion being greater than a width of the second portion of the first channel between the sleeve-receiving portion and the mounting block side wall.

6. The optical fiber module of claim 1 including one of the plurality of second fiber optic connectors in the channel, the one of the plurality of second fiber optic connectors having a longitudinal axis and an end, a wide portion spaced from the end, and an end portion between the wide portion and the end, wherein the wide portion of the one of the plurality of second fiber optic connectors is located in the enlarged portion of the first channel.

7. The optical fiber module of claim 6, wherein the wide portion has a first plurality of planar side walls and wherein the enlarged portion has planar wall portions corresponding to at least some of the first plurality of planar side walls.

8. The optical fiber module of claim 6, wherein the wide portion has a cross section of a polygon and wherein the enlarged portion has a cross section corresponding to at least part of the polygon.

9. The optical fiber module of claim 6, wherein the end portion of the one of the plurality of second fiber optic connectors extends into the sleeve-receiving portion of the first channel and including a sleeve in the sleeve-receiving portion of the first channel around the end portion.

10. The optical fiber module of claim 1, including a second channel in the mounting block.

11. The optical fiber module of claim 1, wherein the mounting block is releasable connected to the plate.

12. The optical fiber module of claim 1,
wherein the optical fiber module includes a housing extending from the plate and having an interior, the mounting block being located in the housing interior,
wherein the front end opening is an opening in the front wall and the rear end opening is an opening in the rear wall,
wherein the first width is greater than the second width and greater than the third width, and
wherein the channel includes a sleeve-receiving portion at the front end opening, a width of the sleeve-receiving portion being greater than a width of the channel between the sleeve-receiving portion and the side wall.

13. An optical fiber module comprising:
plate means having a first side, a second side and at least one through opening;
a plurality of connection elements at the first side configured to releasably secure a plurality of first fiber optic connectors relative to the plate means; and
mounting means at the second side of the plate means, the mounting means including means for securing at least one second fiber optic connector relative to the plate means.

14. The optical fiber module of claim 13, wherein the means for securing includes means for preventing axial rotation of the at least one of the plurality of second connectors.

15. The optical fiber module of claim 13, wherein the means for securing comprises a channel in the mounting means, the channel including an enlarged central portion.

16. The optical fiber module of claim 15, including the at least one second connector in the channel.

17. An optical fiber module comprising:
a plate having a first side, a second side and at least one through opening;
a plurality of connection elements at the first side configured to releasably secure a plurality of first fiber optic connectors relative to the plate; and
a mounting block at the second side of the plate configured to secure, relative to the plate, at least one second fiber optic connector having a longitudinal axis, an end, a wide portion and an end portion between the wide portion and the end,
wherein the mounting block includes a channel having an enlarged portion configured to receive the wide portion of the at least one second fiber optic connector, the channel being configured to permit the insertion of the at least one second fiber optic connector in a direction perpendicular to the longitudinal axis while preventing the removal of the at least one second fiber optic connector in any direction parallel to the longitudinal axis.

18. The optical fiber module of claim 17, wherein the channel is configured to prevent rotation of the at least one second fiber optic connector about the longitudinal axis.

19. The optical fiber module of claim 17, including the at least one second fiber optic connector mounted in the channel with the wide portion of the at least one second fiber optic connector in the enlarged portion of the channel.

20. The optical fiber module of claim 17, wherein the mounting block is removably connected to the plate.

* * * * *